United States Patent
Wacknov et al.

(10) Patent No.: US 11,374,469 B2
(45) Date of Patent: Jun. 28, 2022

(54) ELECTRIC MACHINE WITH INTEGRATED CONTROLLER

(71) Applicant: MAGIcALL, Inc., Camarillo, CA (US)

(72) Inventors: Joel B Wacknov, Westlake Village, CA (US); Dinyu Qin, Oak Park, CA (US); Randy Martin, Thousand Oaks, CA (US); Ken Keller, Reseda, CA (US); Drew Golonsky, Thousand Oaks, CA (US)

(*) Notice: Subject to any disclaimer, the term of this patent is extended or adjusted under 35 U.S.C. 154(b) by 129 days.

(21) Appl. No.: 16/255,765

(22) Filed: Jan. 23, 2019

(65) Prior Publication Data
US 2019/0229590 A1    Jul. 25, 2019

Related U.S. Application Data (60) Provisional application No. 62/625,544, filed on Feb. 2, 2018, provisional application No. 62/620,721, filed on Jan. 23, 2018.

(51) Int. Cl.
*H02K 11/33* (2016.01)
*H02K 7/04* (2006.01)
(Continued)

(52) U.S. Cl.
CPC .......... *H02K 11/33* (2016.01); *B64D 27/24* (2013.01); *B64D 31/06* (2013.01); *B64D 31/14* (2013.01);
(Continued)

(58) Field of Classification Search
CPC ............. H02K 11/23; H02K 7/04; H02K 9/06
(Continued)

(56) References Cited

U.S. PATENT DOCUMENTS

| 3,600,616 A | * | 8/1971 | Yokoyama | H02K 7/1125 310/76 |
| 4,270,161 A | * | 5/1981 | Perretta | F21S 8/08 2/909 |

(Continued)

FOREIGN PATENT DOCUMENTS

| CN | 101348127 | 1/2009 |
| CN | 102969861 | 3/2013 |

(Continued)

OTHER PUBLICATIONS

"International Application Serial No. PCT US2019 014842, Invitation to Pay Additional Fees and Partial Search Report dated Apr. 17, 2019", 10 pgs.

(Continued)

*Primary Examiner* — Jose A Gonzalez Quinones
(74) *Attorney, Agent, or Firm* — Deirdre M Kvale; DMK Intellectual Property Law PLLC (57) ABSTRACT

An electric machine may include a housing having a front end and a back end where the front end is the primary mechanical coupling end. The electric machine may include a stator and a rotor arranged within the housing and a shaft connected to the rotor. The shaft may extend out of the front end of the housing and the shaft may be configured to be rotationally driven by the rotor or to rotationally drive the rotor. The electric machine may also include an electronic controller configured to control operations of the rotor and stator and the electronic controller may be mounted on the front end of the housing.

28 Claims, 8 Drawing Sheets

(51) Int. Cl.
*H02K 7/08* (2006.01)
*H02K 9/06* (2006.01)
*H02K 9/04* (2006.01)
*H02K 11/20* (2016.01)
*H02K 11/21* (2016.01)
*H02K 11/38* (2016.01)
*B64D 33/08* (2006.01)
*B64D 31/06* (2006.01)
*B64D 31/14* (2006.01)
*B64D 27/24* (2006.01)

(52) U.S. Cl.
CPC .............. *B64D 33/08* (2013.01); *H02K 7/04* (2013.01); *H02K 7/083* (2013.01); *H02K 9/06* (2013.01); *H02K 9/04* (2013.01); *H02K 11/20* (2016.01); *H02K 11/21* (2016.01); *H02K 11/38* (2016.01)

(58) Field of Classification Search
USPC .......................... 310/62, 63, 60 R, 75 R, 98
See application file for complete search history.

(56) References Cited

U.S. PATENT DOCUMENTS

| | | | | |
|---|---|---|---|---|
| 5,521,482 | A * | 5/1996 | Lang ................... | G01R 31/343 318/800 |
| 7,122,923 | B2 * | 10/2006 | Lafontaine .......... | H02K 11/048 310/58 |
| 9,270,145 | B2 * | 2/2016 | Asao ..................... | H02K 1/185 |
| 2003/0146029 | A1 * | 8/2003 | Heinen ................ | B60K 7/0007 180/65.51 |
| 2005/0225909 | A1 * | 10/2005 | Yoshizaki ............. | H02H 3/042 361/42 |
| 2006/0022529 | A1 * | 2/2006 | De Filippis .............. | H02K 9/06 310/58 |
| 2010/0021295 | A1 * | 1/2010 | Arel ........................ | B64C 11/06 416/1 |
| 2013/0141871 | A1 | 6/2013 | Omae et al. | |
| 2013/0187517 | A1 * | 7/2013 | Asao ...................... | H02K 11/30 310/68 D |
| 2014/0217844 | A1 * | 8/2014 | Cocks ................... | H02K 11/33 310/64 |
| 2016/0105082 | A1 * | 4/2016 | Bradfield ................ | H02K 9/06 310/54 |
| 2016/0352184 | A1 * | 12/2016 | Kim ...................... | H02K 7/003 |
| 2017/0040873 | A1 * | 2/2017 | Pyeon .................. | B62D 5/0403 |
| 2018/0131308 | A1 * | 5/2018 | Kashima ................ | F25B 13/00 |
| 2019/0002115 | A1 * | 1/2019 | Miller .................... | B64D 35/08 |
| 2019/0101876 | A1 * | 4/2019 | Ghangam ............. | G05B 13/021 |

FOREIGN PATENT DOCUMENTS

| | | | |
|---|---|---|---|
| EP | 2695795 | 2/2014 | |
| EP | 3468011 A1 | 10/2019 | |
| WO | WO-9631390 A1 * | 10/1996 | ............. B64C 11/34 |
| WO | 2019147737 | 8/2019 | |

OTHER PUBLICATIONS

"International Application Serial No. PCT US2019 014842, International Search Report dated Jun. 11, 2019", 6 pgs.
"International Application Serial No. PCT US2019 014842, Written Opinion dated Jun. 11, 2019", 11 pgs.
European Patent Office (EPO), Office Communication re EP Application No. 19705847.2—PCT/US2019/014842 (dated Jan. 27, 2022).

* cited by examiner

ELECTRIC MACHINE WITH INTEGRATED CONTROLLER

CROSS-REFERENCE TO RELATED APPLICATIONS

The present disclosure claims priority to U.S. Provisional Application No. 62/620,721, entitled Integrated Electric Machine and Power Controller, and filed Jan. 23, 2018 and U.S. Provisional Application No. 62/625,544, entitled Integrated Electric Machine and Power Controller, and filed on Feb. 2, 2018, the content of each of which is hereby incorporated by reference herein in its entirety.

TECHNOLOGICAL FIELD

The present application relates to electromechanical devices such as electric machines including motors, generators, or other machines. More particularly, the present application relates to electric machines that have drives, electronic speed controls, power controls, or other controllers. Still more particularly, the present application relates to electric machines with particularly arranged and integrated motor controllers. Still more particularly, the present application relates to electric machines with particularly arranged and integrated motor controllers having features such as electronic circuit breakers and DC bus pre-charging.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing are neither expressly nor impliedly admitted as prior art against the present disclosure.

Electric motors often include a rotating shaft or other articulating component extending from a front end. The shaft may be adapted for mechanically coupling to a power take off device that may use the rotational or articulating energy/power from the motor to perform or do work. The side of the motor where the shaft extends may be a front or primary mechanical coupling end.

Electronic controllers for electric machines are sometimes mounted directly on the machine. The controllers are commonly positioned on a rear end the machine (i.e., opposite the front or primary mechanical coupling end). By locating the controller on the rear end of the machine, the controller may be out of the way of the drive shaft or other components. Moreover, this arrangement of the controller may allow for a logical arrangement between the power source and the motor, such that electrical power may flow through the controller on its way to the motor. This approach may allow for a clean installation without the need for control wires or remote signaling between the controller and the motor.

In many cases, the mounting bracket or other mounting features of the motor may be positioned on the rear end of the motor (i.e., the end opposite the front or primary mechanical coupling end). This approach maintains the mounting screws, bolts, and/or brackets clear of the moving parts of the motor. In situations where a motor controller is integrated with the motor and arranged on the rear end, the controller position may push the functioning parts of the motor (i.e., rotor and stator) further from the mount location creating a more eccentric loading condition on the mount. That is, while this approach maintains the controller in line with the power leading to the motor and maintains the controller out of the way of the working shaft, the overhung moment of the motor may increase. This eccentric loading can create imbalance or may cause vibration to be more likely and/or less controllable during operation of the motor. Still further, the increased overhung moment can cause additional mechanical stress on the machine housing and the motor mount. In some situations, such as on aircraft or other sensitive vehicles, these vibrations may reduce performance or otherwise be problematic.

Separately, many motors do not have means of protection against short circuit either in the motor "bridge" or against short circuit in the DC power bus. Still further, anti-parallel diodes often prohibit the ability to control or protect against reverse current flow that may occur when the motor regenerates (due to overspeed, for example) or in the case of a generator application. Sometimes, fuses may be used to provide protection, but fuses are generally not fast enough to protect solid state transistors, or to keep from shutting the entire power system down by effectively shorting the DC bus. Fuses are also not controllable or resettable. Depending on the motor or machine application, this may be a problem. That is, for high reliability applications, such as in electric aircraft where the drive may be powering a propeller, for example, losses of power without an ability to reset can be dangerous or even catastrophic.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, an electric machine may include a housing having a front end and a back end. The front end may be the primary mechanical coupling end. The machine may include a stator and a rotor arranged within the housing and a shaft connected to the rotor and extending out of the front end of the housing. The shaft may be configured to be rotationally driven by the rotor or to rotationally drive the rotor. The machine may also include an electronic controller configured to control operations of the stator and rotor and the electronic controller may be mounted on the front end of the housing.

In one or more embodiments, an electric machine may include a housing with a stator and a rotor arranged within the housing. The machine may include a shaft connected to the rotor and extending out of the housing and the shaft may be configured to be rotationally driven by the rotor or to rotationally drive the rotor. The electric machine may also include an electronic controller configured to control operations of the stator and rotor and the controller may be integrated with the housing. The electronic controller may also include various other features. For example, the electronic controller may include an integrated electronic circuit breaker. Alternatively or additionally, the electronic controller may include an insulation monitor configured for identifying the presence and source of deteriorating insulation, leakage current, or a short. Alternatively or additionally, the electronic controller may include a load balance feature configured to assist in balancing a load on the machine. Alternatively or additionally, the electronic controller may include control features for a variable pitch propeller. Alternatively or additionally, the electronic controller may include a positional control feature configured for use during startup of the machine and the controller may be configured to switch to a sensorless mode of operation.

While multiple embodiments are disclosed, still other embodiments of the present disclosure will become apparent to those skilled in the art from the following detailed description, which shows and describes illustrative embodiments of the invention. As will be realized, the various embodiments of the present disclosure are cap able of modifications in various obvious aspects, all without departing from the scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present application, in one or more embodiments, includes an electric machine (e.g., motor or generator) with an integrated controller where the controller is mounted or arranged on a front or primary mechanical coupling end of the electric machine. This type of electric machine may be particularly suitable for powering aircraft such as drones, personal aircraft, or other aircraft such as, for example, helicopters, quadcopters, or other hover-type aircraft as well as airplanes or other fixed wing aircraft. In these situations, the above-described electric machine may include a controller positioned on a front of the machine such that it is arranged between the electric machine and the propeller, for example. This position of the controller may be on the opposite side of the machine from the machine mounting surface. This arrangement of the controller may have several advantages. For example, where the machine mount is provided on a back end of the motor, the controller being mounted on the front end may avoid creating additional moment between the mount location and the relatively heavy working elements of the machine. Accordingly, the heavier moving portions of the machine may be in a same or similar position to machine without an integrated controller and, as such, the machine may include a similar overhung moment. This may avoid increased mechanical stress and vibration, which is highly advantageous for aviation and in other contexts. Moreover, the controller may be relatively more sensitive to heat as compared to the portions of the machine such as the rotor/stator. The controller being mounted on the front end of the machine may more fully expose the controller to flowing air or other fluid from a propeller, fan, or other driven element allowing for better control of the controller temperature. In some embodiments, the power transistors within the controller may be arranged about a perimeter of the controller and, as such, may take advantage of the higher cooling effects of the position of the controller. In short, the presently disclosed electric machine may have a reduced weight, reduced cabling weight and losses, reduced EMI, improved controllability, improved sensing and monitoring, improved cooling and improved ease of use.

The present application, in one or more embodiments, may also relate to a machine and/or controller having an integrated electronic circuit breaker. This feature may allow for power interruptions, but may also be quickly resettable. The electronic circuit breaker may also include an ability to control current reversal and may include a pre-charge feature. Additional features may include a bearing life estimator or other maintenance and/or failure anticipating technologies.

Figure 1:
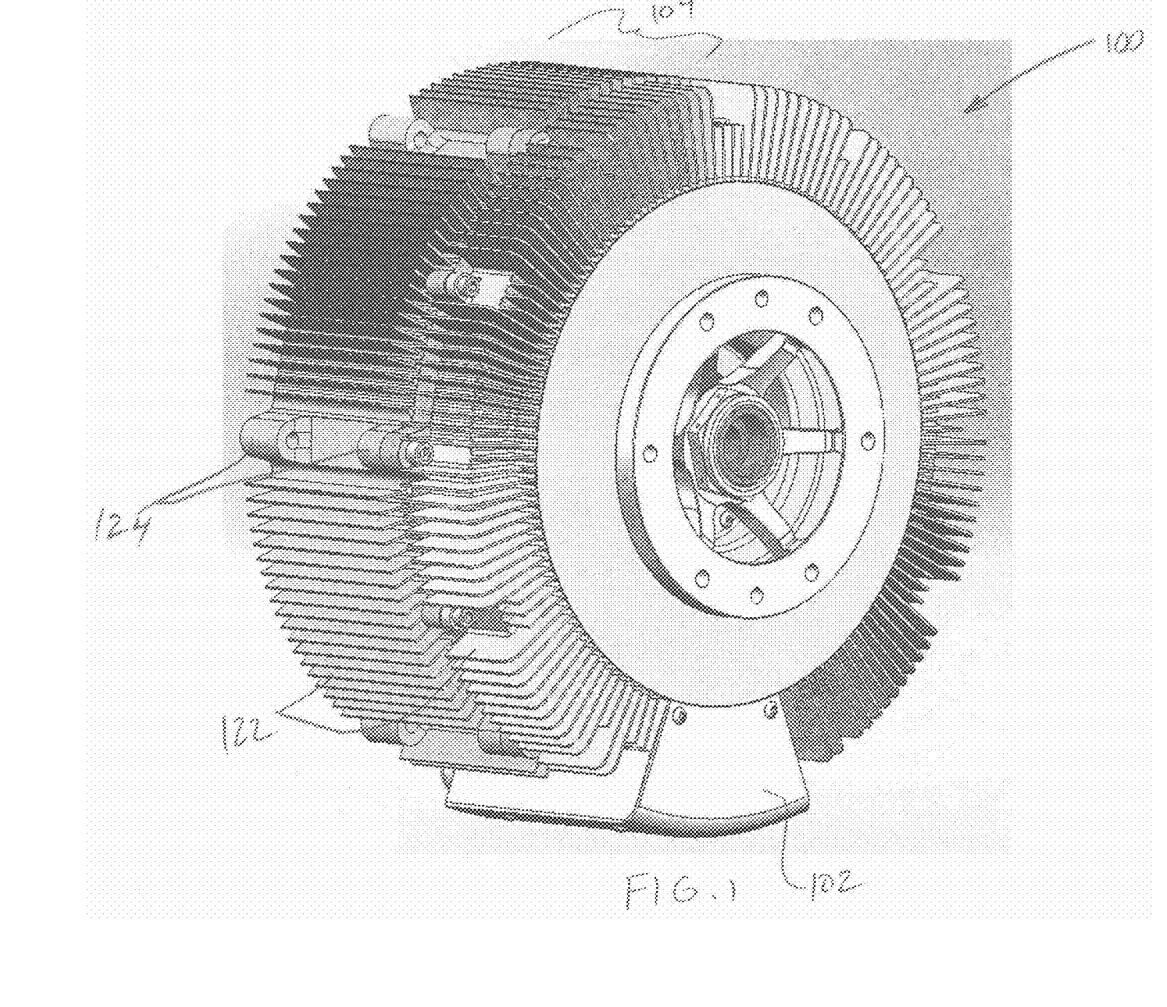
FIG. 1 is a perspective side/front view of a machine with an integrated controller, according to one or more embodiments.
Figure 2:
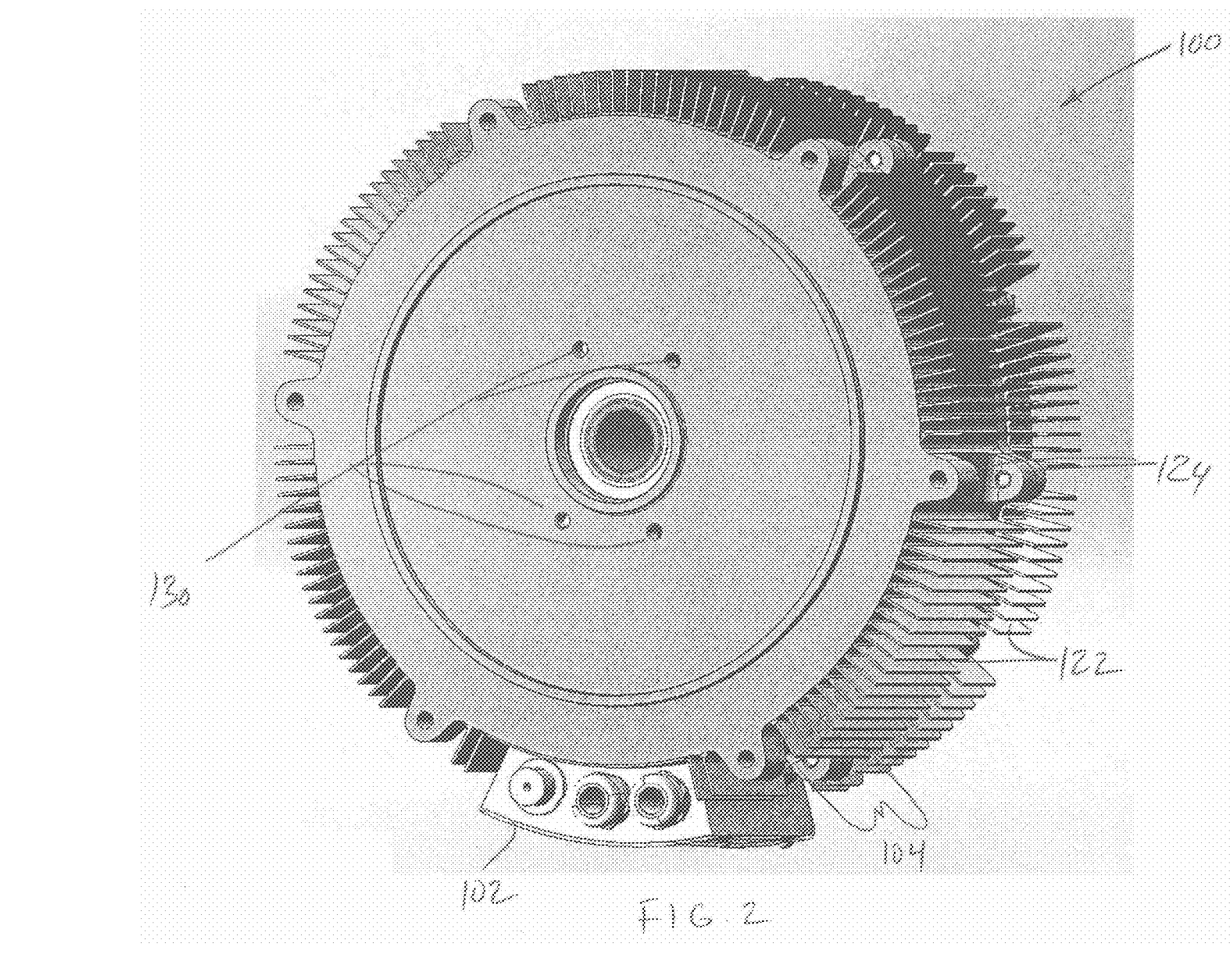
FIG. 2 is a perspective side/rear view of a machine with an integrated controller, according to one or more embodiments.
Figure 3:
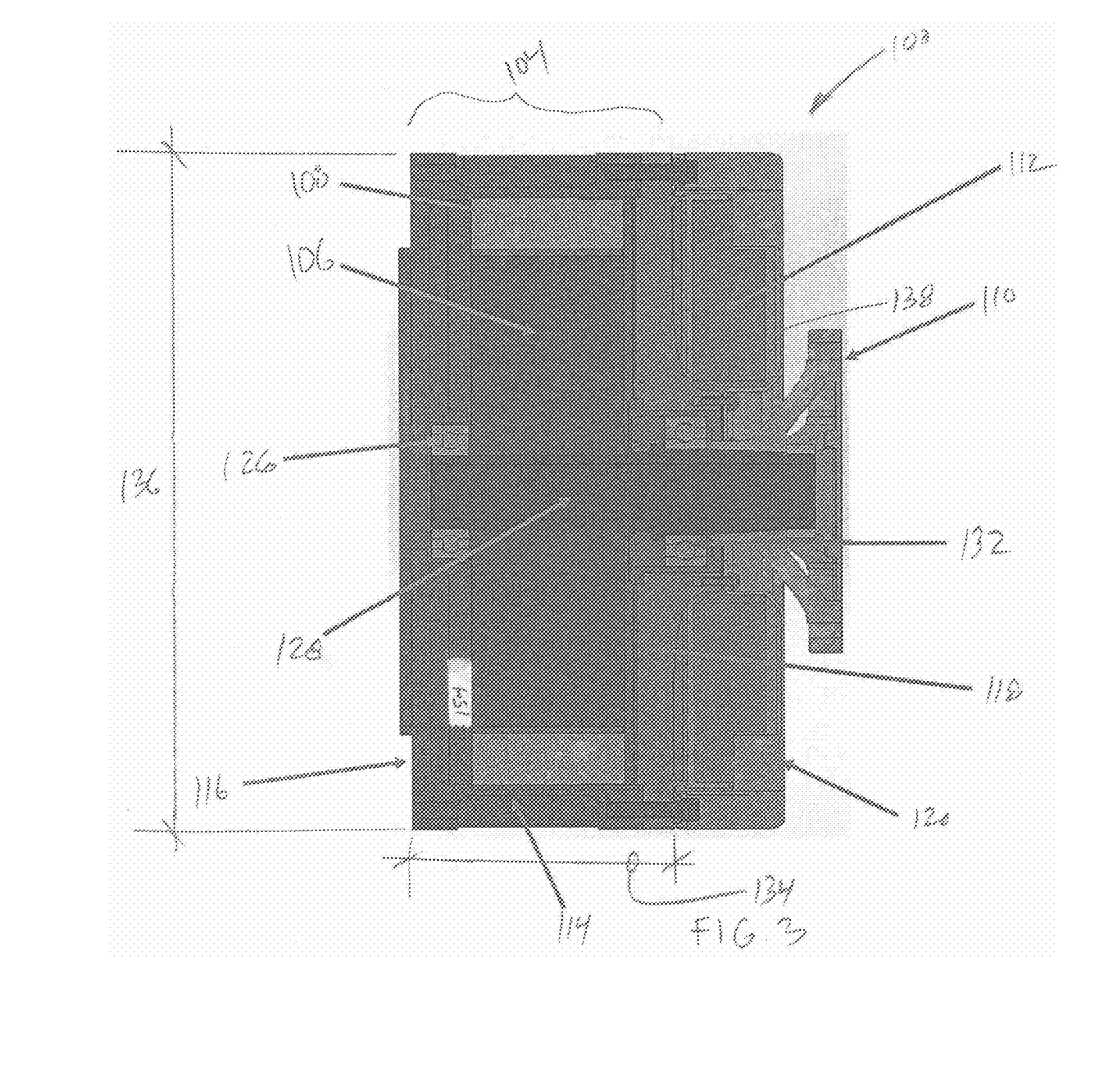
FIG. 3 is a cross-sectional view of a machine with an integrated controller, according to one or more embodiments.

Referring now to FIG. 1, a perspective side/front view of a machine 100 with an integrated controller is shown. FIG. 2 shows a side/rear view of the machine and FIG. 3 shows a cross-sectional view. The electric machine 100 may be configured as a motor, for example, for converting electrical energy into rotational energy by spinning a shaft or other element. Alternatively, or additionally, the electric machine 100 may function as a generator by creating electrical energy from rotational energy as in the case of regenerative e breaking or other power generation situations. Furthermore, in some applications, the machine may alternate between motoring and generating for example, in a vehicle with regenerative braking. The machine 100 may include an electrical power and/or communications interface 102, a housing 104, a rotor 106, a stator 108, a shaft with a power take-off element 110, and a controller 112. As shown, the controller 112 may be arranged on the same end of the machine 100 as the power take-off element 110 and opposite the back end or mounting end of the machine 100. That is, for example, the controller 112 may be arranged on the front or primary mechanical coupling end of the machine (e.g., between the machine and a propeller).

The housing 104 of the machine 100 may be configured for enclosing the moving parts and other components of the machine, for providing a mount for securing the machine, and for providing cooling of the machine. The housing 104 may define an interior and an exterior of the machine and may include a main body portion 114, a rear end bell 116, a front end bell 118, and a controller housing 120. As shown, the main body portion 114 may be substantially cylindrically shaped forming a peripheral wall with a front rim and a back rim. The cylindrically shaped peripheral wall may be well suited for supporting the stator portions of the machine. The peripheral wall may also include cooling fins or elements 122 extending radially outward therefrom. Additionally or alternatively, the cooling fins or elements 122 may include axially extending fins or helical shapes may be used. The cooling fins or elements may be adapted to conduct heat away from the machine and to increase the available surface area of the peripheral wall to better dissipate heat from the machine to the surrounding environment. Each of the front rim and the back rim may include mounts, tabs, or bosses 124, arranged around a perimeter thereof. The mounts or bosses 124 may be adapted to receive screws, bolts, or other fasteners for securing the front end bell 118 and rear end bell 116 of the housing.

The rear end bell 116 of the housing 104 may be a substantially planar element configured to close off the back side of the peripheral wall and provide a support point for the rotor and/or shaft portion of the machine. As shown the rear end bell 116 of the housing 104 may include a rear bearing 126 arranged on an inside surface thereof. The rear bearing 126 may be arranged within a bearing seat on an inside surface of the rear end bell and the rear bearing may be configured for securing the position of the shaft 128 while allowing the shaft 128 to rotate substantially freely. While the shaft 128 is shown to terminate at the inside surface of the rear end bell, in one or more embodiments, the shaft may pass through the rear end bell to provide power to secondary elements. Accordingly, the rear bearing 126 may be arranged in a bearing seat that allows the shaft of the machine to pass through the rear end bell. The rear end bell may include tabs or bosses arranged around a peripheral edge thereof configured for aligning with the bosses on the peripheral wall of the housing and allowing the rear end bell to be secured to the peripheral wall. As shown in FIG. 2, the rear end bell may also include one or a series of mounting holes 130. The holes may be threaded bores extending into the rear end bell allowing the rear end bell, and thus, the machine, to be attached to a mounting bracket, mounting plate, or other mounting element.

The front end bell 118 may function similarly to the rear end bell 116 and may be configured to close off the front side of the peripheral wall and provide a support point for the rotor and/or shaft portion 128 of the machine as the shaft passes through the front end bell 118. As shown, the front end bell 118 may include a front bearing 132 arranged on an inside surface thereof. The front bearing 132 may be arranged within a bearing seat on an inside surface of the front end bell 118 and the front bearing 132 may be configured for securing the position of the shaft 128 while allowing the shaft to pass through the bearing and rotate substantially freely. The front end bell may include tabs or lugs arranged around a peripheral edge thereof configured for aligning with the lugs on the peripheral wall of the housing and allowing the front end bell to be secured to the peripheral wall.

The general geometry of the machine and its housing may be particularly adapted for arranging the controller on the front end of the machine. For example, in one or more embodiments, the machine and its housing may have a length 134 measured from the front end to the back end that is shorter than the diameter 136 of the housing 104. This type of machine geometry may provide for a relatively large surface area on the ends of the machine for arrangement of the integrated controller 112. That is, the larger surface area of the machine on the front end may allow the components of the controller to be spread out laterally across the surface without adding a lot of length to the shaft. For example, where the shaft extends from the front end of the machine and operates a propeller, a clearance space between the back side of the propeller and the front face of the machine may be needed. By providing a relatively broad front surface on the machine, the controller may be placed there without a need to extend the shaft to maintain the clearance sp ace. In the case of aircrafts and propellers, avoiding lengthening of the shaft can be valuable due to vibration and control concerns.

The controller housing 120 may be arranged around and/or may be integrated into the front end bell. As shown in FIG. 3, the controller housing may be an annularly shaped housing providing an annular space between the front end bell 118 and the primary power take off element 110 for arranging controller circuitry, control boards and the like. The controller housing 120, like the peripheral wall, may include a plurality of cooling fins or elements 122. The cooling fins may be adapted to conduct heat away from the machine and to increase the available surface area of the controller housing to better dissipate heat from the controller and/or machine and to the surrounding environment. The controller housing 120 may provide a secured and protected cavity on the front side of the machine and around the drive shaft or power take-off element for controller components to be arranged. The controller components can, thus, be arranged in close proximity to the machine and without interrupting or altering the relative position of the heavier parts of the machine and the mounting portions of the machine. The close proximity of the controller to the machine provides for sensors to be easily integrated. For example, position, temperature, and/or vibration sensors may be included. In addition, and as shown, the controller power transistors, described in more detail below, may be distributed around the outer diameter of the housing. The transistors, including both main transistors and transistors for an electronic circuit breaker, may be arranged in a radial pattern around the peripheral edge of the front of the machine. The positions of the transistors at or near the outer diameter of the housing and in close proximity to the cooling fins or elements 122 may allow for a highly efficient heat transfer and may allow the transistor temperature to be more easily controlled and avoid overheating. It is to be appreciate that while the particular embodiment shown shows the controller arranged on in an area between the front end bell and a dedicated controller housing, a more integrated approach may also be used. For example, the front end bell may be a double wall structure having a cavity for arrangement of the controller components. In still other embodiments, the peripheral wall of the housing 104 may be lengthened in a forward direction providing more room within the housing for controller components to be arranged on an inside surface of the front end bell. Still other approaches to providing a protected space for the controller components may be used.

As mentioned, the machine geometry having a relatively broad diameter relative to its length may allow for the front placement of the controller. The controller 112 and its controller housing 120 may thus have a relatively flat and/or thin shape arranged across the front end of the machine. The controller housing 120 and the controller 112 may be arranged in an annular pattern to avoid interference with the shaft extending from the machine. However, and in addition, due to the broad surface area of the front end of the motor, the controller housing 120 and the controller 112 may be relatively thin and/or pancake shaped in nature.

The electrical power and/or communications interface 102 may be seen in FIGS. 1 and 2. The electrical and/or communications interface 102 may be configured for delivering or receiving electrical power to/from the machine 100. As shown, the interface 102 may include a junction box arranged on the peripheral wall of the housing. The interface may include jacks or ports for connecting electrical power or communications leads from a system the machine is being used in conjunction with. For example, in the case of an aircraft, the communications interface may be configured for connecting to aircraft avionic controls. In one or more embodiments, the interface may be for connecting other types of controls. Where, for example, the machine is used with a wheeled vehicle and the machine is used for powering one or more drive wheels, the interface may be adapted to receive drive and/or navigational controls.

With further reference to FIG. 3, the machine 100 may include a rotor 106 and a stator 108. As shown, the stator 108 may be arranged on an inner surface of the peripheral wall of the housing 104 and may be adapted for magnetically interacting with the rotor to rotationally drive the rotor 106. More particularly, the stator 108 may include a series of coils arranged around the inside surface of the housing 104. The series of coils may be in electrical communication with a power source via a controller 112 to energize the coils and create magnetic fields to drive the rotor 106. The rotor 106 may be arranged within the stator 108 and may be adapted to rotate substantially freely within the stator. For example, the rotor may include a hub arranged on the shaft 128 which may form a wheel. The wheel may include a plurality of magnets arranged on the peripheral surface thereof for magnetically interacting with the stator.

Figure 4:
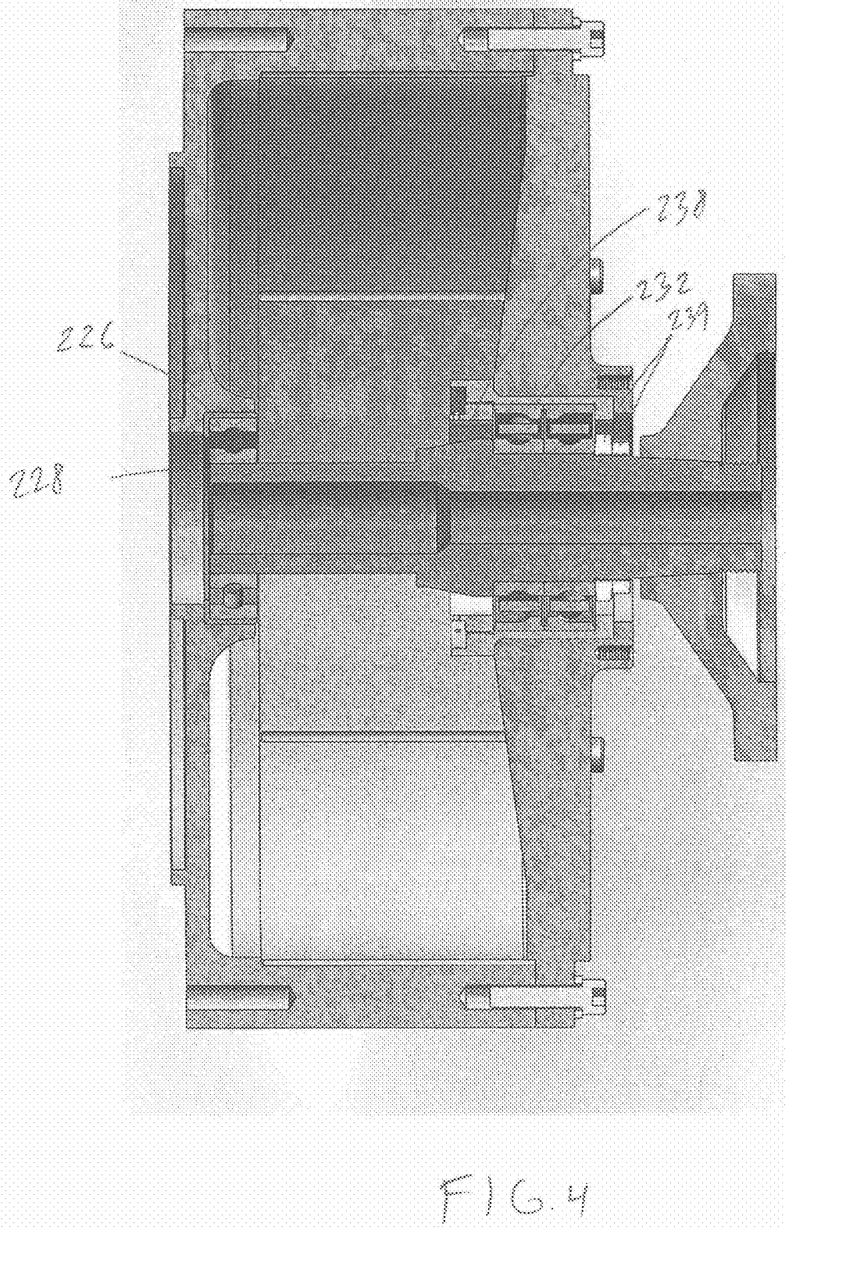
FIG. 4 is a cross-sectional view of a machine with a duplex front bearing, according to one or more embodiments.

As mentioned above, the shaft 128 may be supported on the housing 104 by one or more bearings 126/132. The system of bearings may be adapted to receive and resist both radial and axial loads so as to maintain the position of the shaft 128. In one or more embodiments, as shown in FIG. 3, a front bearing 132 may be provided that is supported by the front end bell and a second rear bearing 126 may be provide that is supported by the rear end bell. In this embodiment, the front bearing may handle the axial load (i.e. thrust) "pulling" on the shaft and the rear bearing may handle the load "pushing" on the shaft. That is, and as shown, the shaft 128 may include a rib or ribs 138 at a location inside the front bearing and the bearing may function with the ribs to prevent forward motion of the shaft relative the bearing and, thus, relative to the machine. Both bearings in this embodiment may be adapted to resist radial loads. In one or more embodiments, the front bearing 232 may include a duplex pair bearing arrangement. This type of bearing may provide a higher degree of mechanical load capacity and rigidity. In this embodiment, the duplex bearing 232 may resist thrust load in both directions. That is, as shown in FIG. 4, the shaft may include a rib or collar 238 at a position inside the front end bearing that may interact with the bearing to resist forward motion of the shaft 228 relative to the bearing and, thus, the machine. In addition, the shaft may include a threaded portion outside the housing or outside the bearing and a pair of nuts 239 may be threaded onto the shaft to secure the position of the shaft relative to the housing. A such, the internal rib or collar 238 and the outer nuts 239 may secure the position of the shaft 228 relative to the bearing In this embodiment, the rear end bearing 226 may be designed to resist solely radial loads. However, a rear bearing that resists radial loads and axial loads may also be used. Still other embodiments with various bearing configurations may be used. It is to be appreciated that while FIG. 4 does not show an integrated controller, the integrated controller features of FIG. 3 may be provided in conjunction with the duplex bearing system of FIG. 4.

In any case, the bearings 126/226 and 132/232 may allow for the shaft to rotate substantially freely and, as such, the rotor may be substantially free to rotate. When power is activated to the machine, the stator may become energized and may magnetically interact with the rotor to rotate the rotor. While one particular type of machine has been described, still other types of machines may be used, including both radial and axial flux machines. Still further, the magnet shapes on the stator or rotor may be sized and shaped for greatest efficiency. In one or more embodiments, protruding magnets such as those described in U.S. patent Ser. No. 15/149,744 entitled Permanent-Magnet Machines Utilizing Protruding Magnets and filed on May 9, 2016 may be provided. The content of this application is hereby incorporated by reference in its entirety.

The shaft 128/228 may be arranged substantially along a centerline of the machine and may be configured to rotate based on rotational power from the rotor/stator. The shaft may be supported by the bearings as mentioned and may extend out the primary mechanical coupling end or front of the housing and may also extend out the back end of the machine. The shaft may be a solid shaft. Alternatively, the shaft may be hollow to allow for the passage of control or sensing elements to the mechanical coupling end of the shaft. In one or more embodiments, for example where a variable pitch propeller is used, the hollow shaft may allow for control elements to pass through the shaft to provide control of the blade pitch. In one or more embodiments, the shaft 128/228 may include a tapered tip allowing for a secure press fit of the power take-off element 110.

A power take-off element 110 may be provided allowing the rotational power from the rotating shaft 128 to be put to use to perform work. In one or more embodiments, the power take-off element 110 may include a flange/hub arranged on the shaft allowing for the attachment of a propeller or a plurality of propeller blades. In one or more embodiments, the power take-off element may include a variable pitch and feathering hub allowing for attachment and control of a variable pitch and feathering propeller. The hub/flange may include a bore extending therethrough and a key or keyway for engaging the shaft 128 of the machine to transfer the torque from the shaft to the hub. The hub/flange may be arranged on the shaft and a hub nut may be threaded onto the shaft to secure the hub/flange to the shaft. The shaft may also protrude from the rear end to provide rotational power for secondary functions or devices, such as sensors, clutches, or brakes, for example.

The controller 112 and the components thereof may be arranged on the front or primary mechanical coupling end of the machine 100 and within the controller housing 120. The controller 112 may be configured to operate the machine and/or the equipment or devices receiving power from the machine. For example, in the case of an aircraft or other device with a variable pitch propeller, the controller 112 may function to control the machine in addition to the pitch of the propeller blades secured to the hub/flange. The controller 112 may perform still other functions.

Figure 5:
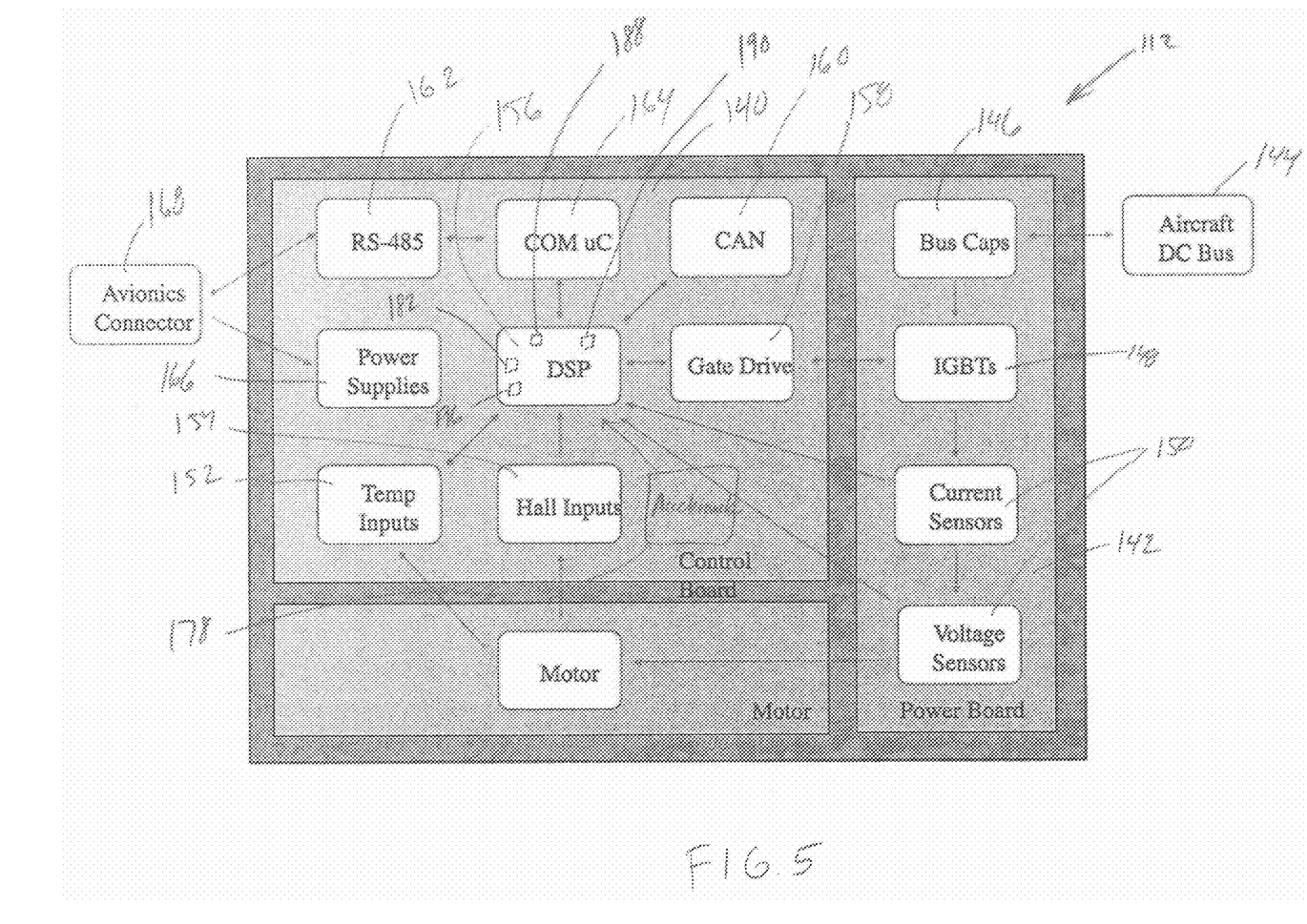
FIG. 5 is a schematic diagram of a controller architecture, according to one or more embodiments.

As shown in FIG. 5, the controller 112 may include a control board 140 and a power board 142. The power board 142 may be configured for interfacing with and managing the power being provided to the machine from a power bus 144, such as an aircraft power bus or another power bus on another supported or powered vehicle, device, or system. That is, while this particular controller is being described as suitable for an aircraft, the machine described herein may be suitable for use in a variety of situations and on other types of equipment, machines, vehicles, or systems. The power board may include bus capacitors 146, power transistors 148, including but not limited to insulated gate bipolar transistors (IGBTs), transistor gate drivers, and one or more sensors 150. The sensors may include current and/or voltage sensors for example.

The control board 140 may be configured for converting and controlling the incoming power to the machine and adjusting the speed and or torque of the machine, for example. The controller 112 may also be configured for more sophisticated controls such as controlling the pitch of a variable pitch propeller or controlling other aspects of a vehicle, aircraft, or other system. As such, the control board 140 may include particular components for such control. In one or more embodiments, the control board 140 may include several different components for interfacing to sensors including, for example, temperature 152, vibration (accelerometer) 178, and position sensing inputs 154 (including but not limited to Hall Effect Sensors). The control board 140 may also include one or more digital signal processors, or other processors 156. The control board may also include gate driver circuitry 158 arranged between the power transistors and the processor, and the control board may also include various communication interfaces such as CAN 160, or RS-485 serial port 162 for interfacing with aircraft avionics, for example. Additionally, a second processor or additional processors 164 may be used to manage the communications or other functions, separate from the main machine control processor. The control board 140 may also include various ancillary power supplies 166 to power the components internal to the controller, as well as receive control power from the avionics connector 168.

Figure 6:
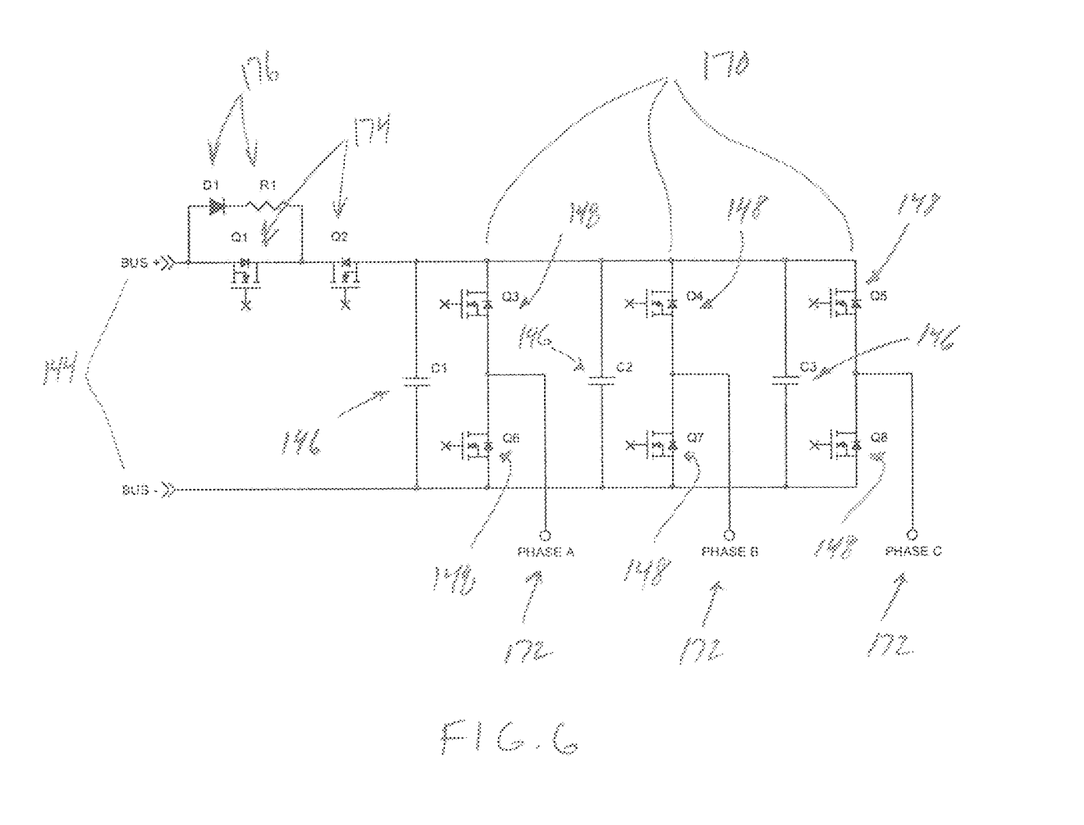
FIG. 6 is a schematic circuit diagram of a controller with an electronic circuit breaker, and optionally, integrated DC bus pre-charge function, according to one or more embodiments.

Turning now to FIG. 6, a schematic electrical diagram for use with the present machine is shown. As shown, power for the drive may be provided as a positive and negative power bus 144. The electrical system may include one or more drive bridges 170 each including a plurality of transistors 148 arranged in pairs across the positive and negative buses of the power bus 144. The bridges may be arranged in parallel with one another. In addition, DC bus capacitance 146 may be provided by a plurality of capacitors, each arranged in parallel with a pair of transistors to form a bridge. Phase connections 172 may be provided between the transistors for connection to the electric machine that the controller is driving. As shown, the system may be provided with one bridge consisting of three pairs of transistors to drive a three phase electric machine winding. However, in other embodiments the system may have six pairs of transistors configured as two bridges to drive two separate three phase windings, or one six phase electric machine winding, for example. Other numbers of transistor pairs, bridges, and machine windings are also possible, which can provide a higher level of performance and redundancy should one or more of the bridges fail.

The system may be provided with an electronic circuit breaker 174 and/or a pre-charge network 176. The electronic circuit breaker (ECB) 174 may be provided by a pair of transistors arranged along the positive power bus as shown. Alternatively or additionally, the ECB may be arranged along the negative power bus. The pre-charge network 176 may include a diode and a resistor arranged in parallel with the positive power bus, and in other embodiments, at least one of the transistors forming the electronic circuit breaker. In one or more embodiments, the transistors may include MOSFETs (as shown). Alternatively, the transistors may be IGBTs or other power switching devices.

It is to be appreciated that by integrating the ECB into the drive, a highly reliable power system may be implemented without the need to install external protection (i.e., fusing or ECB). Also, the mentioned cooling system for the main power transistors 148 may be used to cool the ECB 174. For example, the transistors for the ECB 174 may be arranged in a similar location (i.e., around the peripheral edge of the machine) as the main power transistors 148 to take advantage of the cooling effect of cooling elements on the housing and the controller location. The drive may also include an established digital communications bus to the overall system, so the control of the ECB as well as health and status monitoring (Voltage, Current, Power, Temperature) are easily incorporated without additional cost or complexity. Moreover, integrating the ECB into the drive may allow the direction of power flow to be controlled. For example, if no regenerative power is to be allowed in the system (i.e., power returned to the DC bus from the drive), only the Q2 transistor may be turned on and the Q1 transistor left off. Alternatively, if the drive is being used strictly as a generator, only Q1 may be turned on and Q2 left off. If bi-directional power flow is desired, both Q1 and Q2 may be turned on. This may be the normal mode of operation.

The optional DC bus pre-charge function may operate in conjunction with the ECB components. Pre-charge may allow for bringing the DC bus capacitors (C1-C3) 146 up to voltage in a controlled manner without drawing a large amount of current from the DC bus. This may be useful, for example, if the motor drive is brought on-line while the DC bus is fully energized. If there were no pre-charge function, and the ECB were just switched on, there would be a very large inrush of current charging C1-C3, which could cause damage to the ECB components as well as disrupt other equipment on the bus. In one embodiment, diode D1 and resistor R1 form a pre-charge network which will slowly charge C1-C3 when just Q2 of the ECB is turned on. Then, after charge is complete, Q1 may be turned on and the drive may be ready for normal bi-directional operation. Other embodiments of implementing the pre-charge function are possible, such as operating Q1 and Q2 in the linear region to charge C1 in a controlled manner.

Additional features of the system may include features associated with previously mentioned sensors such as the integrated accelerometer 178 and the position sensors 154. In additional further features such as insulation monitoring 182, integrated control of a variable pitch propeller 184, and an integrated cooling fan 186 may also be provided. Each of these will be discussed in turn.

The integrated accelerometer 178 may include an accelerometer built into the controller 112. The accelerometer 178 may be used to monitor vibration. The monitored vibration may be used to help determine the health of the bearing and mechanical systems. For example, as bearings wear, vibration may increase and, as such, varying amounts of vibration may be used to assess the condition of the bearings over time. A bearing life estimator 190 may be provided as a part of the controller 112 (i.e., as part of the processor 156) and the amount of vibration sensed by the integrated accelerometer may be one of the inputs received by the bearing life estimator. The bearing life estimator 190 may also use other factors such as the amount of time since bearing replacement, temperature, speed, flight hours or other use, and the like. The accelerometer readings and/or the results of the bearing life estimator may be reported to the external control system over the digital communications bus, for example.

In addition to bearing life, the accelerometer 178 may be used to balance a load on the machine, such as, for example, a propeller secured to the shaft of the machine. The accelerometer 178 and position sensors 154 may be used to correlate vibration (acceleration) with rotor position. This information may also be provided over the digital communication bus to determine the location and the amount of material to be added (or removed) from the propeller or other load in order to bring the propeller or other load into balance. A load balance feature 188 may be built into the processor 156 of the controller 112, for example.

Position sensors 154 may be provided to allow for control of motor commutation and speed. As shown in FIG. 3, the sensor may be arranged on an inside surface of the housing and may sense the rotor position based on magnetic sensing of the rotor magnets. In addition, the absolute position of the propeller or other load may be determined. In one or more embodiments, this position sensing may be used together with the vibration to assist with balancing the propeller or other load. Alternatively, or additionally, the position sensors may be used to hold the propeller in a specific orientation during the flight of the aircraft or during other operations. Still further, the controller can use the sensors to start the motor, but can continue to operate in a sensorless mode if the position sensors fail and, thus, providing a high level of reliability. For example, the motor may be started more reliably using the sensor because the rotor position can be determined from the sensors. Moreover, once the motor is running the rotor position may be determined by other methods such as back-EMF or voltage monitoring. As such, if the position sensors were to fail after the motor is running the controller may continue to operate using a "sensorless" method. That is, the controller may include a rotor positional sensing feature for sensing the position of the rotor and that may be used at startup. Then, and optionally, the controller may switch to sensorless operation if, for example, the sensors were to fail.

In one or more embodiments, the position sensors 154 may be used to control the radial orientation of the shaft, particularly during stoppages. For example, where a particular orientation of a propeller arranged on the shaft is desired, the position sensors may be used to assess the position such that a rotor positional control feature of the machine/controller can rotate the shaft and position the propeller accordingly. In one example, some aircraft may use propellers to elevate an aircraft until the aircraft is in a suitable position to move or fly laterally. In some embodiments, other systems or devices may be used to propel the aircraft laterally and the propeller may cease functioning once the other systems take over. In this situation, it may be desirable to rotate the propeller to a position to minimize drag or other interference. In this embodiment, the position sensors may be used to assess the position of the rotor/shaft and communicate that position to the rotor positional control feature such that machine/controller may be informed sufficiently to rotate and hold the propeller to the desired position.

The insulation monitoring feature 182 may be used to identify shorts or leakage current paths inside a motor, for example, between the high and low voltage sections of the motor. For example, it can be important to detect if one of the high voltage DC inputs or AC motor leads becomes shorted to the chassis (ground). At the system level, while a problem may be identified, the source of the problem cannot. That is, at the system level, the particular motor with the problem may not be identified. If there are eight motors on a single DC bus, for example, one short may create a problem, but identifying which motor is the source of the problem is not clear. An insulation monitoring feature 182 may be built into the controller 112 to monitor each motor and it can report over the digital communications bus, which motor has the problem.

Figure 7:
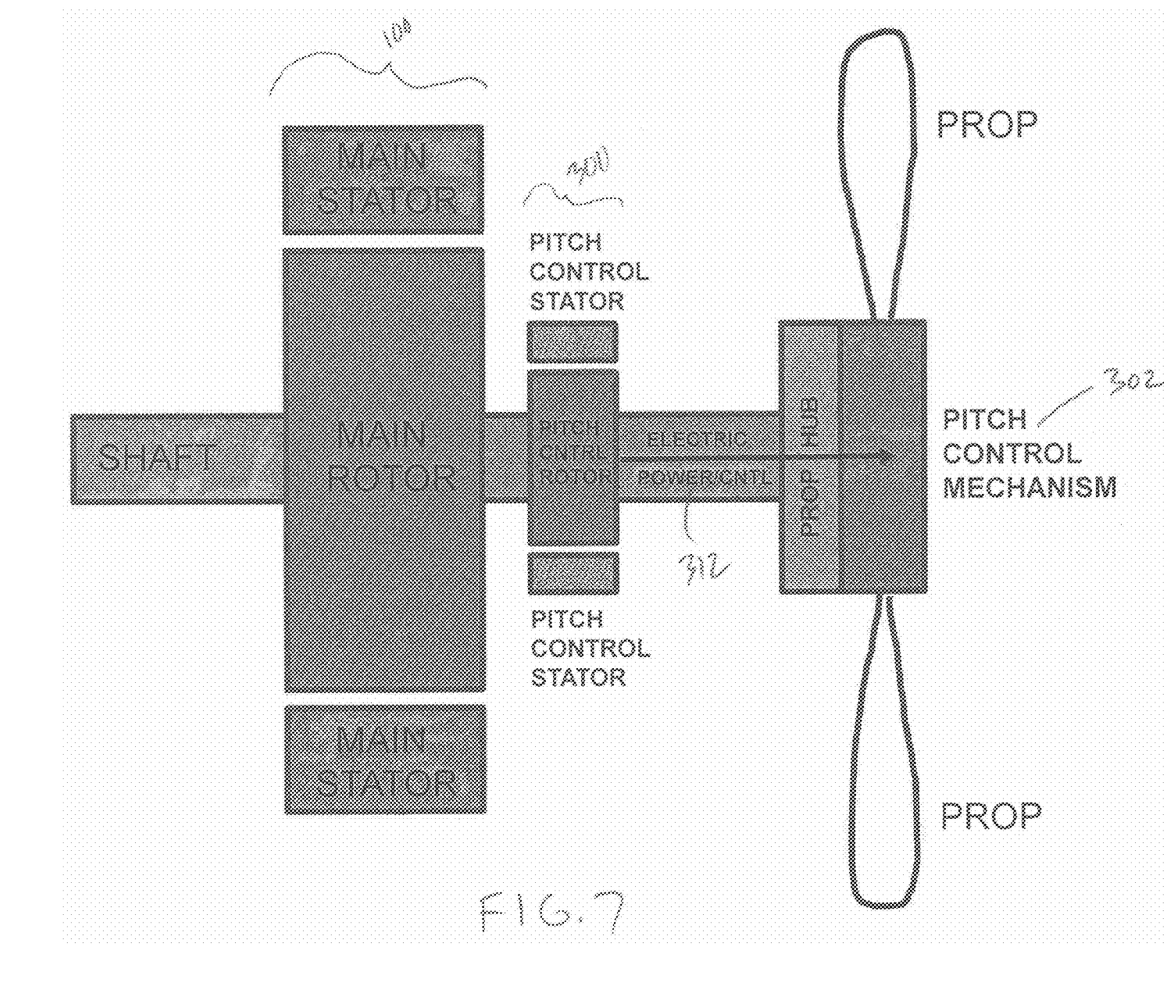
FIG. 7 is a schematic cross-sectional diagram of an electric machine having a dual control, for a variable pitch mechanism, according to one or more embodiments.

As mentioned, the controller may be multi-purpose. That is, for example, the controller may be cap able of operating the motor and controlling the motor speed and or torque. However, the controller may also function to interface with the load on the motor and control further aspects or features of the load. For example, as shown in FIG. 7, the controller may be a dual control and may function to control the rotational speed of the propeller, but also the pitch of the blades on the propeller. This may involve a primary machine 100 with a rotor and a stator and a secondary or pitch control machine 300 with a rotor and a stator. The controller 312 may be configured for controlling each of these machines to control the power being provided by the propeller through the speed of the propeller and the pitch of the blades of the propeller. This may reduce or eliminate the need for a separate controller for this purpose. As shown, the mechanism to control the propeller may be built into the motor and may include a secondary generator 300 on the motor shaft to power the pitch control mechanism 302, as opposed to a mechanical system that operates with linkages through the hollow shaft.

Figure 8:
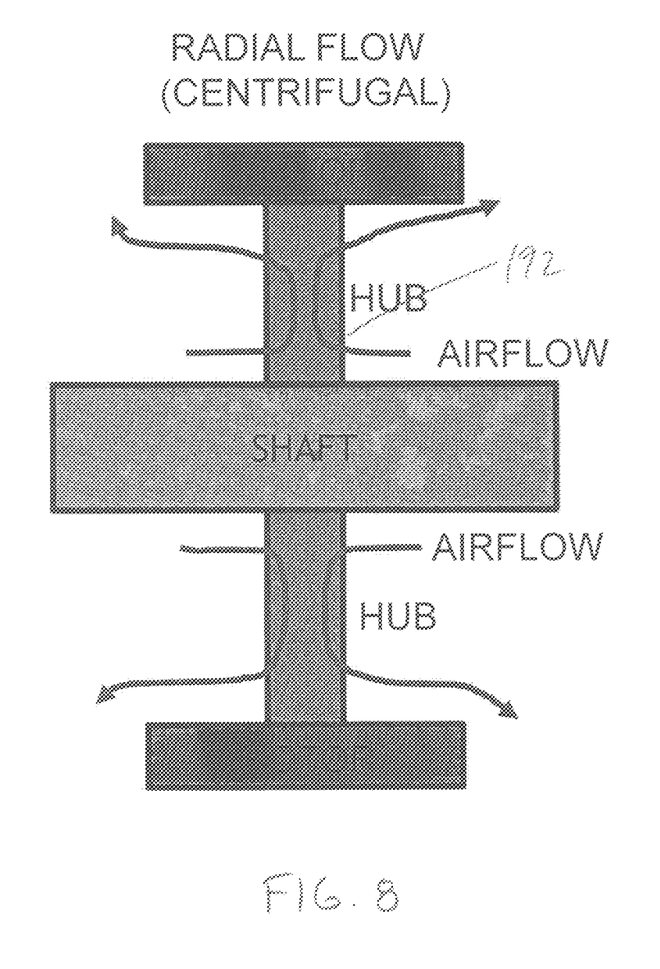
FIG. 8 is a schematic cross-sectional diagram of an electric machine having an integrated fan providing for radial flow, according to one or more embodiments.
Figure 9:
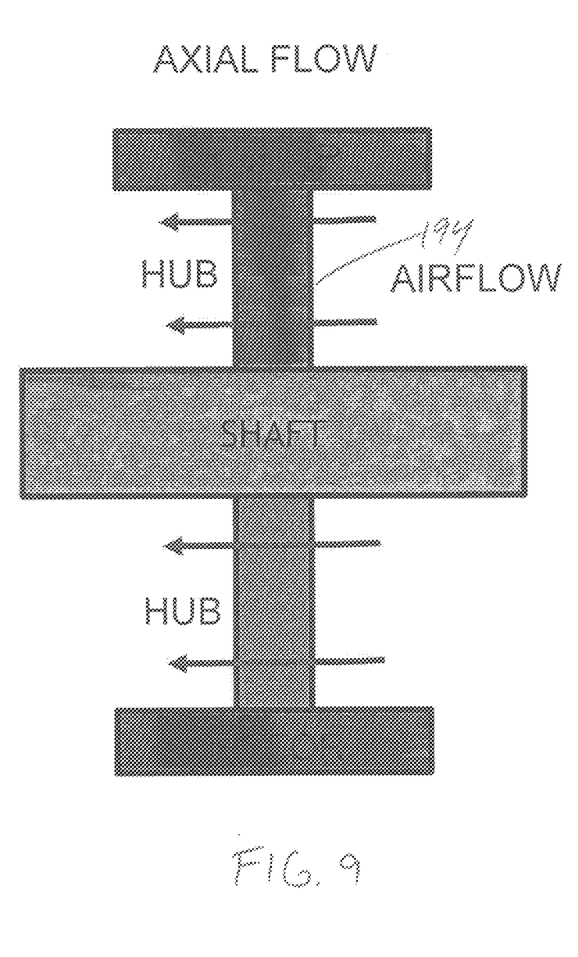
FIG. 9 is a schematic cross-sectional diagram of an electric machine having an integrated fan providing for axial flow, according to one or more embodiments

In one or more embodiments, the system may include an integrated fan. For example, the fan may include an integrated exterior fan such as a plurality of axial flow fan blades mounted on a hub on the shaft outside the housing. This may be used when, for example, the machine is not being used with a propeller. Additionally or alternatively, and as shown in FIGS. 8 and 9, the system may include an integrated internal fan. For example, and as shown in FIG. 8, the rotor hub structure may be used as a radial flow (centrifugal) blower 192. In this embodiment, the spokes of the rotor may include fan blades arranged to throw air radially as the rotor rotates. For example, relatively flat blades arranged in a plane perpendicular to the plane of the rotor may be provided. In other embodiments, similarly arranged blades may be used where the cross-section of the blade is cupped or has a shape other than flat. In one or more other embodiments, and as shown in FIG. 9, the rotor hub structure may be used as an axial flow blower 194. In this embodiment, the spokes of the rotor may include fan blades canted at angle such that rotation of the rotor causes air to flow across the plane of the rotor. In either case, this may provide airflow inside the motor providing for internal cooling of the rotor, stator, and controller. That is, rather than relying solely on the cooling fins or elements to dissipate heat from the motor and the controller, the rotating portion of the motor may be used to circulate air inside the motor further dissipating the heat from the components.

The several features and sensors of the controller may be suitable for monitoring many characteristics and properties of the machine and may often be relied on for protecting the machine from damage. For example, excessive temperatures, excessive vibration, current, speed, or positional misalignment may be identified by the sensors and may be used to identify improper or unsuitable operation and may trigger shutdown of the machine before damage to the machine occurs. However, in the case of an aircraft, losses of power may be more catastrophic than damage to the machine. Accordingly, the controller may include an assessment tool 196 allowing for continued operation during improper or unsuitable operation of the machine such that the aircraft may continue to receive power until it can be safely landed.

In one or more embodiments, the assessment tool may be in communication with the one of more sensors including the temperature sensor, the accelerometer, and/or the position sensor. The assessment tool 196 may have a series of thresholds (i.e., one for each sensor) above which operation of the machine is considered to be improper or unsuitable. When these thresholds are exceeded, the assessment tool may indicate a dangerous condition and may trigger an alert to the user to land the aircraft or other vehicle. The assessment tool may limit the power to the machine in a manner that allows for continued operation of the machine, but also limits the amount of damage that the machine may incur. The assessment tool may continue to monitor the sensor results and upon landing of the aircraft, if the sensor results continue to exceed the threshold, the machine may be shutdown.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, embedded computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. A system may include volatile memory (e.g, random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as digital and analog general purpose I/O, a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joy stick, game pad, switch, buzzer, bell, and/or other user input/output device for communicating with one or more users or for entering information into the system. These and other devices for interacting with the system may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, I2C, SPI, USB, etc.) using any of a variety of commercially available bus architectures.

One or more programs or applications, such as a web browser and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and up date information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hot spot, a global communications network, such as the Internet, and so on. The system may be operable to communicate with wired and/or wireless devices or other processing entities using for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer, server, controller, or message sign, or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including for example, a computer-implemented process, a business process, and/or any other process), apparatus (including for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. An electric machine, comprising:
a stator and a rotor;
a shaft connected to the rotor and rotationally coupled to a front end bell and a rear end bell through bearings and extending forward of the front end bell, the shaft configured to be rotationally driven by the rotor or to rotationally drive the rotor; and
an electronic controller configured to control operations of the stator and rotor disposed within a controller housing at a front end of the machine, the controller housing having a front face and including a shaft opening and a recessed hub concentric with the shaft opening having a recessed hub surface spaced from the front face and abutting the front end bell and forming a hub cavity about the shaft opening and the hub cavity having an axial depth extending from the front face to the recessed hub surface proximate to the front end bell and having a diameter sized to accommodate a mechanical coupling or power take-off element at the front end of the machine.

2. The electric machine of claim 1, wherein a rear end of the machine spaced from the front end of the machine includes at least one mounting feature.

3. The electric machine of claim 1, wherein the controller comprises an integrated electronic circuit breaker.

4. The electric machine of claim 1, wherein the controller comprises a pre-charge feature.

5. The electric machine of claim 1, further comprising an integrated interior cooling fan.

6. The electric machine of claim 1, further comprising a bearing life estimator configured for receiving sensor input and estimating a remaining life of at least one of the bearings based on the sensor input.

7. The electric machine of claim 1, wherein the controller comprises an assessment tool configured for receiving sensor data and limiting operation of the machine when unrestricted operation is deemed unsuitable.

8. The electric machine of claim 1, further comprising an insulation monitor configured for identifying the presence and source of electrical insulation deterioration.

9. The electric machine of claim 1, further comprising a load balance feature configured to use input from a position sensor and accelerometer to assist in mechanical balancing of a load on the machine.

10. The electric machine of claim 1, wherein the controller comprises control features for a variable pitch propeller coupled to the shaft.

11. The electric machine of claim 1, wherein the shaft comprises a tapered interface for the mechanical coupling.

12. The electric machine of claim 1, further comprising a rotor positional sensing feature configured for use during startup of the machine and the controller is configured to optionally switch to a sensorless mode of operation.

13. The electric machine of claim 1, further comprising a rotor positional control feature wherein a position sensor provides rotational shaft position input to the rotor positional control feature and the rotor positional control feature positions the shaft in a selected position when the shaft is stopped.

14. The electric machine of claim 1 wherein the recessed hub surface includes a plurality of fastener openings spaced about the shaft opening to connect the controller housing to the front end bell.

15. The electric machine of claim 1 wherein the controller housing includes a plurality of fastener openings about an outer circumference to connect the controller housing to the front end bell.

16. The electric machine of claim 1 wherein the controller includes a plurality of transistors arranged in a radial pattern about the recessed hub normal to a rotation axis of the shaft and spaced about an outer perimeter of the controller housing.

17. The electric machine of claim 1 wherein the controller housing has a stepped outer diameter forming a first outer diameters and a second stepped outer diameter smaller than the first outer diameter and a plurality of radial fins are spaced about the stepped outer diameter of the controller housing to provide a radial length extending from the first outer diameter and an axial length forward of the first outer diameter.

18. The electric machine of claim 1 wherein the machine includes a power take-off element coupled to the shaft within the hub cavity of the recessed hub configured to support a propeller attached to the power take-off element.

19. The electric machine of claim 1 wherein the controller housing is connected to the front end bell to form a cavity for the electronic controller.

20. The electric machine of claim 1 wherein the recessed hub surface is orientated generally perpendicular to a rotation axis of the shaft to form a perimeter flange to connect the recessed hub of the controller housing to the front end bell.

21. An electric machine comprising:
a stator and a rotor;
a shaft connected to the rotor and rotationally connected to a front end bell and a rear end bell and the shaft extending beyond the front end bell, and the shaft configured to be rotationally driven by the rotor or to rotationally drive the rotor;
an electronic controller enclosed within a controller housing to control operations of the stator and the rotor and the controller housing including a stepped outer diameter forming a first outer diameter and a second stepped outer diameter smaller than the first outer diameter; and
a plurality of radial fins spaced about the stepped outer diameter of the controller housing to provide a radial length extending from the first outer diameter and an axial length forward of the first outer diameter, wherein the controller includes a plurality of transistors spaced about the first outer diameter within a stepped cavity formed by the stepped outer diameter of the controller housing.

22. The electric machine of claim 21 wherein the controller housing is coupled to the front end bell and the controller housing includes a recessed hub spaced from a front face of the controller housing forming a hub cavity sized to accomodate a power take-off element or mechanical coupling.

23. The electric machine of claim 21 wherein the plurality of radial fins are "L" shaped to form the radial and axial lengths of the fins.

24. An electric machine, comprising:
a stator and a rotor;
a shaft connected to the rotor and rotationally coupled to a front end bell and a rear end bell through bearings and the shaft extending from the front end bell and the shaft configured to be rotationally driven by the rotor or to rotationally drive the rotor;
a controller housing coupled to the front end bell including a recessed hub having a recessed hub surface spaced from a front face of the controller housing abutting the front end bell and the recessed hub forming a hub cavity enclosing a shaft opening and sized to accommodate a mechanical coupling or power take-off element;
a pitch control mechanism coupled to the mechanical coupling or power take-off element at a front end of the machine to adjust a pitch of a propeller rotated via the shaft through the mechanical coupling or power take-off element;
a generator including a rotor coupled to the shaft and a stator operable to power the pitch control mechanism to adjust the pitch of the propeller; and
an electric controller configured to control operations of the rotor and stator and the controller comprising control features to adjust the pitch of the propeller.

25. An electric machine comprising:
a stator and a rotor;
a shaft connected to the rotor and rotationally coupled to a front end bell and a rear end bell via bearings and the shaft having a length extending from the front end bell and the shaft configured to be rotationally driven by the rotor or to rotationally drive the rotor;
an electric controller configured to control operations of the rotor and stator and a controller housing for the controller and the controller including a controller structure having an inner edge and an outer edge radially spaced from the inner edge and the inner edge of the controller structure being spaced radially outwardly from a recessed hub at a front of the controller housing to support the controller in a radial space between the recessed hub and an outer perimeter of the controller housing; and
a power take-off element or mechanical coupling coupled to the shaft and positioned in the recessed hub.

26. An electric machine comprising:
a stator and a rotor;
a shaft connected to the rotor and rotationally connected to a front end bell and a rear end bell and the shaft extending beyond the front end bell, and the shaft configured to be rotationally driven by the rotor or to rotationally drive the rotor;
an electronic controller enclosed within a controller housing and configured to control operations of the stator and the rotor and the controller housing including a stepped outer diameter forming a first outer diameter and a second stepped outer diameter smaller than the first outer diameter; and
a plurality of radial fins spaced about the stepped outer diameter of the controller housing to provide a radial length extending from the first outer diameter and an axial length forward of the first outer diameter, wherein the controller includes a plurality of transistors arranged in a radial pattern with respect to a shaft opening of the controller housing and spaced about a stepped perimeter of the controller housing.

27. The electric machine of claim 26 wherein a front face of the controller housing includes a recessed hub about the shaft opening and the recessed hub is sized to accomodate a power take-off element or mechanical coupling coupled to the shaft.

28. An electric machine, comprising;
a stator and a rotor;
a shaft connected to the rotor and rotationally coupled to a front end bell and a rear end bell through bearings and extending forward of the front end bell, the shaft configured to be rotationally driven by the rotor or to rotationally drive the rotor;
a controller housing at a front end of the machine for an electronic controller configured to control operations of the stator and rotor and the electronic controller including a controller structure having an inner edge and an outer edge radially spaced from the inner edge; and
a power take-off element coupled to the shaft through a flange having an elongate length and an end surface that abuts the front end bell and the inner edge of the controller structure is spaced from the shaft to a form a radial gap sized to accommodate the length of the flange connecting the power take-off element to the shaft so that the end surface of the flange abuts the front end bell.

* * * * *